United States Patent Office 3,502,741
Patented Mar. 24, 1970

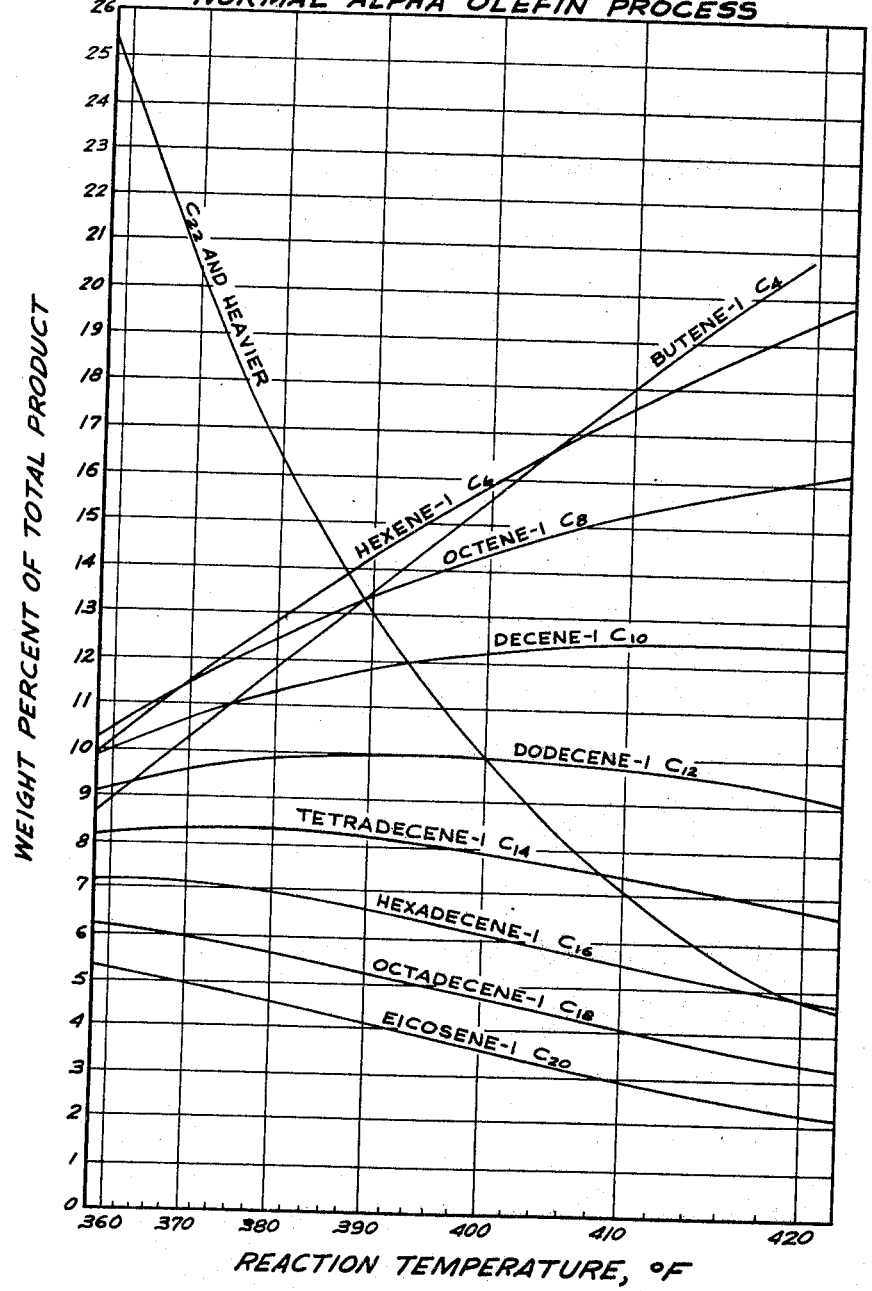
INVENTORS
HERBERT B. FERNALD
WILLIAM GALL
BERNARD H. GWYNN
ELWOOD E. NELSON

3,502,741
METHOD FOR REDUCTION OF POLYMER FORMATION IN A PROCESS FOR CONVERTING ETHYLENE TO ALPHA OLEFINS
Herbert B. Fernald and William Gall, Glenshaw, Pa., Bernard H. Gwynn, Leawood, Kans., and Elwood E. Nelson, Gibsonia, Pa., assignors to Gulf Research & Development Company, Pittsburgh, Pa., a corporation of Delaware
Filed Nov. 9, 1966, Ser. No. 593,214
Int. Cl. C07c 3/10
U.S. Cl. 260—683.15     16 Claims

ABSTRACT OF THE DISCLOSURE

The process for the conversion of ethylene to alpha olefins in the presence of an organometallic catalyst is improved by utilizing a hydrocarbon oil derived from a natural crude which has been hydrogen treated to reduce the sulfur content to between about 1 and 4000 parts per million.

---

This invention relates to a process for the catalytic conversion of ethylene to normally liquid alpha olefins in the presence of a polymer inhibiting amount of a hydrocarbon oil containing between about 1 and 4000 parts per million of sulfur.

Alpha olefins are produced from ethylene by the stepwise conversion of gaseous ethylene to higher straight-chain normally liquid olefins having the double bond in the terminal or alpha position, which reaction proceeds as follows:

$$CH_2=CH_2+CH_2=CH_2 \rightarrow CH_3-CH_2-CH=CH_2$$

$$CH_3-CH_2-CH=CH_2+CH_2=CH_2$$
$$\rightarrow CH_3-CH_2-CH_2-CH_2-CH=CH_2$$

etc. This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

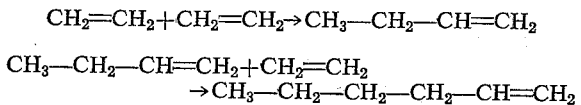

The transalkylation (displacement) reaction which occurs concurrently with the growth reaction consists of two steps. These are, first, thermal decomposition of an aluminum alkyl group to a hydride plus alpha olefin followed by a rapid reaction of the hydride with ethylene to regenerate an ethyl group which can start another growth cycle. The thermal decomposition is much slower than the reaction of ethylene with a hydride and, therefore, is the rate-determining step for the over-all reaction.

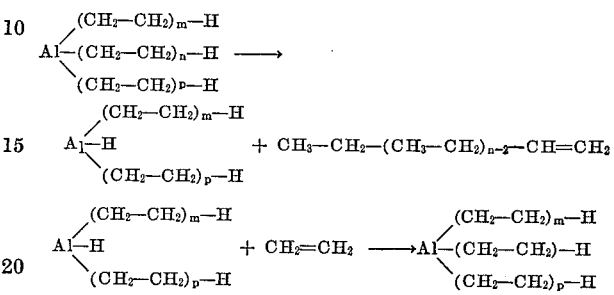

The growth and displacement reactions occur repeatedly as long as there is unreacted ethylene present. Therefore, the reaction is advantageously afforded a very high residence time. As long as there is free ethylene in the presence of catalyst in the reactor under reaction conditions, each mole of catalyst present will produce additional normal alpha olefin product. Therefore, a long residence time is conducive to a high alpha olefin yield per mole of catalyst, i.e., a high catalyst efficiency.

The third reaction is similar to the first except that the aluminum alkyl adds a product alpha olefin, rather than ethylene, to form a branched chain aluminum alkyl group. However, this structure is very unstable and rapidly decomposes to form a hydride and an olefin of vinylidene structure.

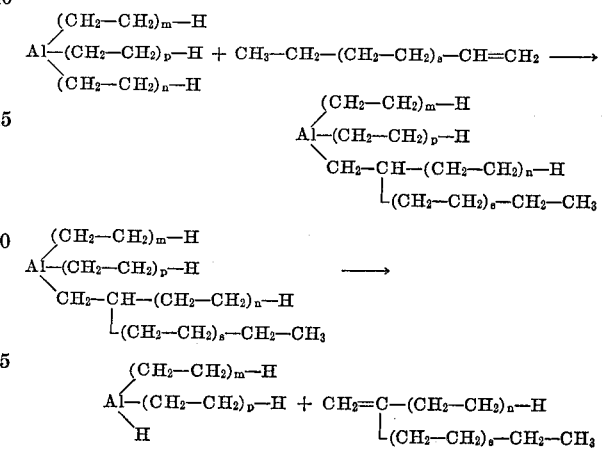

The decomposition is so rapid compared to the addition of another ethylene molecule to the branched alkyl that essentially all reactions of this type result in an olefin of vinylidene structure and regeneration of an aluminum ethyl alkyl group. As a result, there will be few, if any, alpha olefins with branching beyond the beta carbon.

Low temperature favors the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

It is believed that the higher molecular weight alpha olefins produced at temperatures below reaction temperatures may be precursors to the solid polymers which it is the purpose of the present invention to inhibit. Therefore in performing the process of the present invention cold ethylene charge is preheated substantially to full reaction temperature, i.e., to within about 5° F. or 10° F. of reaction temperature, prior to addition of catalyst thereto and commencement of the reaction. For example, when the reaction is performed continuously in a tubular reactor surrounded by a heat exchange medium, cold ethylene is charged to the inlet end of the tube and permitted to become preheated. The catalyst is injected into the tube at the downstream position therein at which ethylene has substantially reached full reaction temperature. In this manner, production of relatively high molecular weight alpha olefins is avoided.

In view of the fact that the production of normal alpha olefins is the object of the above reactions, ethylene is the sole olefin which can be employed in the charge. The normal alpha olefins produced will have from four to about 40 carbon atoms and will be primarily liquid with practically no solid polymer produced except as an undesired by-product. The normal alpha olefins produced, particularly the $C_{12}$, $C_{14}$ and $C_{16}$ alpha olefins, have high utility for the production of detergents.

The catalyst employed in the alpha olefin process can be defined by the following structural formula: $M'_aM_bR_cX_d$, wherein $M'$ is a metal selected from the alkali or alkaline earth metals and $a$ can be either 0 or one; M is a metal selected from the group consisting of aluminum, gallium, indium and beryllium and $b$ can be either 0, one or two, except that $a+b$ is at least one; R is selected from the group consisting of monovalent saturated aliphatic or alicyclic radicals, monovalent aromatic radicals or any combination thereof; X is selected from the group consisting of hydrogen and halogen. The sum of $c$ and $d$ is equal to the total valences represented by the metals, and when X is a halogen $c$ must be at least one. Examples of catalysts which can be employed include $Be(C_2H_5)_2$, $LiC_2H_5$, $$HAl(CH_3)_2$$

$$Al(CH_3)_3, Al(C_2H_5)_3, Al(C_4H_9)_3, Al(C_3H_7)_3$$

$$Al(C_6H_5)_3$$

$$Ga(CH_3)_3, Ga(C_2H_5)_3, In(C_2H_5)_3, In(CH_3)_3$$

$$Be(C_6H_5)_2$$

$$Na(C_5H_{11}), Al(C_2H_5)_2Cl, Al(C_2H_5)Cl_2$$

$$Al(C_4H_9)_{1.5}Cl_{1.5}$$

$$Al(C_4H_9)_2Cl, LiAlH_4, NaAlH_4, LiAl(C_2H_5)_4$$

$$NaAl(C_4H_9)_4$$

$Mg(AlH_4)_2$, $Zn(C_2H_5)_2$, etc. A preferred catalyst is an aluminum alkyl, such as triethylaluminum. The catalyst can be used as such, but preferably is employed with about 70 to 98 percent by weight thereof of a solvent as described below. Since it is desired to produce a liquid alpha olefin product rather than a relatively high molecular weight solid polymer, the catalyst should be substantially free of catalyst components, such as, for example, $TiCl_4$, which tend to cause production of relatively high molecular weight solid polymers. The amount of catalyst required herein is not critical and can be from about $1 \times 10^{-4}$ to about $1 \times 10^{-2}$ moles per mole of ethylene.

The temperature of the reaction can range from about 285° F. to about 615° F., generally, from about 350° F. to about 430° F., preferably, and from about 380° F. to about 400° F., most preferably. The upper range of pressure employed is not critical and can be as high as about 1000 atmospheres or even higher, but the lower pressure range, however, is critical. The pressure should be sufficiently high that most of the alpha olefin product is a liquid under reaction conditions and so that the catalyst and most of the ethylene are dissolved or dispersed in said liquid. As soon as liquid alpha olefin product is produced, the catalyst tends to entirely dissolve therein. It is important to have as high as possible a concentration of ethylene in the phase containing the catalyst, otherwise liquid olefin product rather than ethylene will tend to react with the catalyst to produce vinylidenes. Therefore, the pressure should be sufficiently high to force as much ethylene as possible into the liquid phase together with the catalyst. After there has been a conversion of 55 to 60 percent of the ethylene, there is sufficient liquid product to dissolve substantially all the ethylene and produce a single homogeneous phase in the reactor. Thus, the pressure in the reactor must at all times be at least about 1000, and preferably within the 2000 to 4000 pounds per square inch gauge range, and can be even higher.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base, water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred method the aluminum catalyst is removed from the alpha olefin product by reaction with caustic solution to form $Na_2OAl_2O_3$ plus paraffin as follows:

$$2H_2O + 2NaOH + 2AlR_3 \rightarrow Na_2OAl_2O_3 + 6 \text{ paraffin}$$

It is shown in Ser. No. 153,815, filed Nov. 21, 1961, now abandoned, that the amount of the desired normal alpha olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achieve high selectivity toward normal alpha olefins the reactants and product should flow substantially as a column through the tube whereby there is a minimum of backmixing so that the percentage of normal alpha olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha olefins per mole of aluminum alkyl catalyst charged. A high residence time and avoidance of backmixing is most conveniently achieved by utilizing a very long tubular reactor.

During the above-described conversion of ethylene to liquid normal alpha olefins having from about 4 to 30 or 40 carbon atoms, a small but highly deleterious quantity of solid polymer is formed. The polymer deposits on reactor surfaces, interfering with heat transfer so that the reactor must be periodically shut down for removal of said polymer. Furthermore, polymer which is formed which does not adhere to reactor surfaces is carried out of the reactor in the effluent stream to avoid fouling surfaces of equipment downstream from the reactor, such as heat exchangers and distillation columns.

We have now discovered that the presence during the reaction of a minor amount, based upon the ethylene feed, of a relatively high molecular weight hydrocarbon oil containing between about 1 and 4000 parts per million of sulfur, such as a high sulfur-content hydrocarbon, fraction derived from natural crude oil which has been hydrogenated to lower the initially high level of sulfur therein to a sulfur level within the range of this invention, advantageously not only reduces the quantity of polymer produced to a small proportion of its uninhibited level but also significantly increases the catalyst efficiency of the process, i.e., increases the amount of alpha olefin produced per mole of catalyst employed, as compared to a similar process employing the same feed rate and residence time except that said high molecular weight fraction is not added. It has not been possible to identify the sulfur containing compounds in the natural crude from which the hydrocarbon fractions of this invention are derived. However, we have found that heavy hydrocarbon fractions, which are substantially free of sulfur do not exhibit polymer inhibitive properties. Moreover, data presented below show that the sulfur-containing hydrocarbon fractions of this invention reduce polymer formation to a lower level than the level achieved by adding any of a large number of specific sulfur-containing additives.

The proportion of sulfur in the hydrocarbon fraction must not be above the range of this invention. For example, it was found that 4800 parts per million of sulfur in the hydrocarbon fraction excessively reduced catalyst efficiency. Therefore, the hydrogenation treatment of the natural crude-derived hydrocarbon fraction is critical since it removes a portion of the sulfur by converting it to hydrogen sulfide. In accordance with the present invention, the sulfur content in the hydrocarbon is between about 1 and 400 parts per million by weight, generally, and between about 10 and 3000 parts per million by weight, preferably.

The hydrogen treatment of the natural crude oil-derived hydrocarbon fraction can be performed under conventional conditions. For example, the fraction can be hydrogenated at a temperature between about 500° F. and 875° F. in the presence of known hydrogenation catalysts such as Group 6 or Group 8 metals on alumina, silica-alumina or other acidic catalyst supports.

In addition to inhibiting formation of polymer, the hydrocarbon fraction concomitantly serves to increase catalyst efficiency, probably by performing a solvent function in the alpha olefin reactor. In order to achieve a beneficial solvent effect, the hydrocarbon fraction of this invention must be a relatively high boiling fraction. It must have an over point of at least about 550 to 600° F. generally, about 650° F., preferably, and about 700° F. or 750° F., most preferably, i.e., the solvent should comprise substantially only components which have boiling points above these temperatures. In terms of molecular weights comparable to these temperatures, it is noted that the $C_{22}$ alpha olefin of the process has a boiling point of 692° F.

As a solvent, the hydrocarbon fraction exerts its beneficial effect upon the process in the initial stages of the reaction. For example, in a tubular reactor the hydrocarbon exerts its beneficial solvent effect near the zone of the reactor tube whereat ethylene and catalyst are first contacted with each other. After the reaction proceeds to a significant extent the product itself assumes the solvent function and eventually far exceeds in quantity the initially added hydrocarbon fraction. Catalyst which is continuously added to the reactor is advantageously dissolved in the hydrocarbon fraction in any suitable concentration range, such as between about 0.1 and 40 percent by weight, generally, and between about 1.0 and 25 percent by weight, preferably.

Ethylene is added to the reactor first and then catalyst dissolved in the hydrocarbon fraction of this invention is added to the ethylene. Upon addition of the catalyst and hydrocarbon fraction to the ethylene charge, substantially all the catalyst remains dissolved in the hydrocarbon fraction. In order to encourage the production of normal alpha olefins in the reactor it is important that as much as possible of the gaseous ethylene reactant be rapidly dissolved in the phase containing the catalyst i.e., the liquid hydrocarbon fraction phase. Under the temperature and pressure conditions of the reactor a substantial quantity of ethylene is almost immediately dissolved in the liquid hydrocarbon fraction phase enabling the reaction to proceed readily. As normal alpha olefin product is produced, this product in turn is available as a solvent and as the reaction proceeds the product produced in the reactor becomes dominant in quantity.

It is an advantageous feature of this invention that the catalyst and hydrocarbon fraction is not added to a tubular reactor together with unheated ethylene, but rather that the unheated ethylene charge be added separately to the inlet end of a tubular reactor immersed in a heat exchange medium so that said ethylene becomes preheated to full reactor temperature before catalyst and hydrocarbon fraction are then injected into the tubular reactor at the downstream position closest to the inlet end of the reactor whereat the temperature of the ethylene has just about reached the reaction temperature. If the catalyst and hydrocarbon fraction were added to the reactor together with the unheated ethylene, the hydrocarbon fraction would encourage a high reaction rate at a temperature which is below the control reaction temperature because of the presence of non-preheated ethylene. This factor is enhanced in view of the fact that the hydrocarbon fraction itself helps to dissipate the heat of the reaction. Increasing the rate of the reaction at a temperature below the desired reaction temperature is severely disadvantageous because the temperature of the reaction determines the carbon number distribution in the normal alpha olefin product and relatively low reaction temperatures encourage production of the least desirable components of the product.

The carbon number of the product components is a highly important consideration because the $C_{12}$, $C_{14}$, and $C_{16}$ alpha olefins are the most desirable components of the product, being useful for the production of detergents, while the $C_{22}$ and higher molecular weight alpha olefins are the least desirable components of the product because it is believed that they are able to further polymerize to produce the solid polymers which adhere to the walls of the reactor tube to reduce heat transfer and necessitate periodic reactor shutdowns. The accompanying figure is a graph showing how the carbon number distribution of the alpha olefin product of the process of this invention varies with temperature. The graph of the drawing clearly shows the predominance of $C_{22+}$ product at low reaction temperatures.

It is apparent that if the catalyst and hydrocarbon fraction were added to cold ethylene, the solvent function of the hydrocarbon fraction would tend to enhance the efficiency of the reactor for the production of an undesirable product. On the other hand, if the ethylene is added separately to one end of the reactor tube and permitted to become preheated prior to addition of catalyst and the hydrocarbon fraction, while the catalyst and hydrocarbon fraction are introduced at a downstream position in the reactor coil whereat the ethylene has been just about preheated to reaction temperature, the hydrocarbon fraction will function as a solvent to enhance the efficiency of the reactor for the production of the most desirable alpha olefin products of the process.

Generally, in accordance with the present invention the process does not produce substantially any alpha olefin product having a molecular weight higher than the components of the hydrocarbon fraction except for the relatively small amount of undesired solid polymer which tends to foul walls of the reactor tube. In the process of the present invention wherein a liquid rather than a solid product is produced, the solvent activity of the hydrocarbon fraction functions by increasing the initial rate of production of alpha olefins, i.e., in furthering the reaction during its early stages before a quantity of alpha olefin product has been produced substantially equal to the quantity of hydrocarbon fraction added with the catalyst. This solvent function of the hydrocarbon fraction is sharply contrasted to the function of a solvent in processes which use organometallic catalyst together with cocatalysts such as $TiCl_4$ to produce a product having a much higher molecular weight than the product of the present process and which are solid rather than liquid, i.e., have a molecular weight from about 2,000 to 1,000,000 or 2,000,000. The primary function of a solvent in such processes is to form a slurry with the solid polymer product and to facilitate its removal from the reactor. In performing this function the solvent exerts its primary effect after the product is produced, rather than before production of any substantial amount of product as is the case in the method of the present invention.

In the production of high molecular weight solid polymers, a relatively large quantity of solvent is required to form a slurry of the solid product. In contrast, it is a critical feature of the present invention that only a relatively small amount of hydrocarbon fraction is employed. In the performance of the present invention in a tubular reactor a highly beneficial effect is achieved when a small quantity of hydrocarbon fraction is employed while an increase in said quantity above the critical value of this invention causes the hydrocarbon fraction to actually exert a detrimental effect upon the process. The presence of a relatively small amount of hydrocarbon fraction, said amount being within the range of the present invention, encourages formation of a homogeneous liquid phase containing substantially all the catalyst and a substantial quantity of dissolved ethylene in which the reaction can proceed. As liquid product is formed it is miscible with and is incorporated into the homogeneous liquid phase, providing an enlarged liquid phase into which still more ethylene can dissolve to be in close promixity to the catalyst and thereby participate in the reaction.

The reason that a relatively small quantity of hydrocarbon fraction should be employed is to enable the hydrocarbon fraction to assist in initiating the reaction without consuming an excessive amount of reactor volume to excessively reduce the residence time of catalyst and ethylene in the reactor. As noted above, each molecule of organometallic catalyst reacts repeatedly with unreacted ethylene as long as said catalyst remains in the reactor. If the amount of hydrocarbon fraction employed is increased above the range of this invention, it consumes an excessive amount of reactor volume causing residence time to decrease excessively. An excessive decrease in residence time limits the extent of the reaction and thereby negates any advantage in reactor efficiency otherwise achievable by the use of a solvent.

When the hydrocarbon fraction is added to the reactor in small quantities, an increase in reactor efficiency begins to appear. As the amount of hydrocarbon fraction is increased, the increase in reactor efficiency continues until a maximum is achieved. Thereupon, use of a quantity of hydrocarbon fraction above the range of this invention imparts a decrease in reactor efficiency, because loss of residence time within the reactor becomes the controlling feature. Therefore, it is critical that the amount of hydrocarbon fraction employed is not more than about 50 percent by weight of the total charge to the process, and the amount of hydrocarbon fraction is between about 0.1 and 25 percent by weight, generally, and between about 2 and 15 percent by weight, preferably.

It is not merely the quantity of hydrocarbon fraction added which is a critical consideration in holding the adverse effect of the hydrocarbon fraction upon residence time within permissible limits, but also the composition of the hydrocarbon fraction. In fact, the composition of the hydrocarbon fraction can be a much more important consideration in this regard. For example, the hydrocarbon fraction should not contain significant quantities of any component which will vaporize to any appreciable extent under the temperature and pressure conditions of the reactor. A gaseous component in the reactor, other than ethylene, not only will not contribute to the desired solvent effect of the hydrocarbon fraction but also will impart a much more serious diminution of residence time than the presence of the same number of moles of a liquid because of the much greater volume occupied by a material in the gaseous state. In order to substantially completely avoid the presence of components in the hydrocarbon fraction which will vaporize to a significant extent in the reactor it is advantageous to employ a hydrocarbon fraction which is comprised nearly entirely of components whose critical temperature is above reactor temperature and whose critical pressure is below reactor pressure, said hydrocarbon fraction being substantially free of significant quantities of components whose critical temperature and pressure do not meet these requirements. Therefore, the hydrocarbon fraction should be substantially free of components which boil below about 550 to 600° F., generally, 650° F., preferably, and 700° F. or 750° F., most preferably.

EXAMPLE 1

The above observations regarding solvent function of a hydrocarbon fraction of this invention are illustrated by the data in Table 3, below, which compare the solvent function in terms of catalyst efficiency and reactor efficiency of various lubricating oil fractions derived from natural crude oil, i.e., a heavy neutral lubricating oil, a 150 bright stock lubricating oil and a 200 bright stock lubricating oil. The heavy neutral lubricating oil had an initial boiling point near 848° F., the 150 bright stock lubricating oil had an initial boiling point near 940° F., and the 200 bright stock lubricating oil had an initial boiling point near 980° F. The reactor and catalyst efficiencies produced by the oils having the initial boiling points of 940° F. and 980° F. were higher than the reactor and catalyst efficiencies produced by the oil having an over point of 848° F., indicating that solvents which are relatively free of lighter and more volatile components are more advantageous than solvents containing a greater quantity of volatile components.

The following examples illustrate the advantageous effect of the hydrocarbon fraction of this invention upon inhibition of polymer formation.

EXAMPLE 2

A series of tests were conducted to determine the polymer inhibiting effect in an alpha olefin process of a hydrotreated lubricating oil derived from a natural crude. The effect of the production of even a small amount of polymer in an alpha olefin process is very great in terms of tube fouling, causing interference with heat transfer and requiring periodic reactor shut-downs in order to clean the tubes. These disadvantageous effects occur even though the amount of ethylene converted to polymer is an extremely small fraction of the amount of ethylene converted to the desired alpha olefins. Therefore, if tests were to be performed under conventional operating conditions, the test period would have to be extensive in order for sufficient polymer to be produced in relation to alpha olefin yield to render the measurements reliable. Furthermore, tests which extend over an unduly long period would consume relatively large amounts of ethylene and catalyst before a reliable measurement could be obtained.

Therefore, a test procedure was devised to accelerate the production of polymer and provide an indication of the effectiveness of a hydrocarbon fraction of this invention upon polymer inhibition. These tests employed lubricating oil as a polymer inhibitor under polymer producing conditions much more severe than those ordinarily encountered in an alpha olefin process in which a lubricating oil inhibitor of this invention is apt to be utilized.

The test procedure was devised on the theory that polymerization in an alpha olefin reactor is encouraged because of formation of a co-catalyst in the system by reaction between a catalyst such as triethylaluminum and metal oxides on oxidized reactor metal surfaces, such as, for example, oxides of molybdenum, nickel, iron, chromium, copper, aluminum, titanium, cobalt, tungsten, zirconium, etc., followed by reaction of ethylene with said co-catalyst to produce said polymer. These co-catalysts do not tend to form with metals in non-oxidized reactor tubes, such as reactor tubes which have been freshly acid washed. Based upon this theory, a number of metal oxides were tested together with triethylaluminum as catalysts for polyethylene formation. One of the best combinations tested for encouragement of polymer formation was a commercial colloidal aluminum oxide and triethylaluminum. Therefore, this combination was utilized in the tests described below.

In the tests, 3.0 grams of the commercial aluminum oxide plus about 10 grams (6.0 weight percent) of triethylaluminum in a lubricating oil as described below were charged to a one-gallon autoclave equipped with a stirrer, a bottom outlet line, inlet lines for adding ethylene, a thermowell for a thermocouple to measure temperature, and an outlet for a pressure gauge. Some ethylene was charged to the autoclave and then the temperature was brought to full reaction temperature of 392° F. The pressure was then brought to 500 pounds per square inch gauge by the addition of ethylene. As ethylene was converted either to polyethylene or to alpha olefins fresh ethylene was added so that the pressure of 500 pounds per square inch gauge was maintained throughout the reaction period. The reaction was allowed to proceed for 8 hours at which time the product was discharged through a filter for collection of the polymer. The amount of ethylene reacted was determined by the difference in the amount of ethylene metered into the autoclave and the amount of ethylene discharged at the end of the test period. The autoclave was disassembled and all the polymer on the inside autoclave surfaces was collected and processed with the polymer from the filter to remove lubricating oil, product olefins and inorganic contaminants in order to determine the weight of dry polyethylene produced in the test. The polyethylene produced was expressed as parts per million based on the total ethylene reacted.

The effectiveness of the lubricating oil of this invention in a cyclohexane solvent as a polymer inhibitor was determined by comparing the results obtained in the presence of lubricating oil with the results obtained in a similar test except that no lubricating oil or other polymer inhibitor was present in the cyclohexane solvent. Tests were also performed to compare the effectiveness of the lubricating oil of this invention is a cyclohexane solvent against the use of a cyclohexane solvent to which had been added various compounds containing sulfur and/or nitrogen.

The lubricating oil utilized as an inhibitor in the tests was a heavy neutral oil derived from a natural crude oil containing sulfur which was catalytically hydro-treated to reduce its sulfur content. Following are some characteristics of the lubricating oil tested.

HEAVY NEUTRAL BASE OIL

Density—0.8939 (7.443 pounds per gallon)
Viscosity S.U.S.:
  100° F.—589
  210° F.—68.8
Pour point—5° F.
Sulfated ash—<0.001 weight percent
Over point—707° F.
D1160—($C_{22}$ alpha olefin=692° F.)

Vacuum distillation corrected to 760 mm.:

| Percent condensing: | ° F. |
|---|---|
| 5 | 869 |
| 10 | 892 |
| 20 | 917 |
| 30 | 927 |
| 40 | 940 |
| 50 | 951 |
| 60 | 961 |
| 70 | 972 |
| 80 | 991 |
| 90 | 1016 |
| 95 | 1043 |

Following is a further analysis of the heavy neutral base oil:

| Total saturate content: | Volume percent |
|---|---|
| Alkanes | 3.9 |
| Non-condensed cycloalkanes | 47.7 |
| Condensed cycloalkanes | 27.5 |
| Benzenes | 3.6 |
| Naphthanes | 0.4 |
| Total | 83.1 |

| Total aromatic content: | Volume percent |
|---|---|
| Benzenes | 4.8 |
| Indanes | 2.9 |
| Dinaphthenebenzenes | 1.3 |
| Naphthalenes | 1.6 |
| Benzothiophenes | 0.7 |
| Phenanthrenes | 0.6 |
| Dibenzothiophenes | 0.5 |
| Pyrenes | 0.8 |
| Chrysenes | 0.4 |
| Naphthobenzothiophenes | 0.3 |
| Acenaphthylenes | 1.1 |
| Acenaphthenes | 1.3 |
| Total | 16.3 |

Nitrogen, 57 p.p.m.; sulfur, 218 p.p.m.; oxygen, 192 p.p.m.

The results of the tests performed in accordance with the above test description are presented in Table 1, below.

| Test | Inhibitor | Amount | Polymer Produced, p.p.m. Based on Total Ethylene Reacted | Catalyst Efficiency, Grams Ethylene Converted per Gram of Triethyl Aluminum |
|---|---|---|---|---|
| 1 | Cyclohexane used as a catalyst solvent with no inhibitor present. | | 2,000–2,500 | 110–120 |
| | *(Materials which significantly reduce polymer production)* | | | |
| 2 | Sulfur and nitrogen-containing hydrogenated lubricating oil derived from a natural crude, ml. | 20 | 325 | 126 |
| 3 | do | 40 | 49 | 133 |
| 4 | Phenothiazine, gm 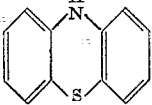 | 0.25 | 231 | 89 |
| 5 | Phenothiazine, gm 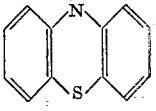 | 0.5 | 282 | 109 |
| 6 | 2-mercaptobenzothiazole, gm 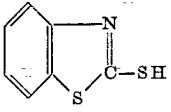 | 0.1 | 91 | 109 |
| 7 | Diphenyl amine, gm 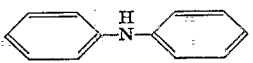 | 0.2 | 526 | 162 |
| 8 | Dodecyl sulfide, gm<br>$C_{12}H_{25}-S-C_{12}H_{25}$ | 10 | 289 | 129 |
| | *(Materials which reduce polymer production but which also severely reduce catalyst efficiency)* | | | |
| 9 | 4,4′-methylene bis 2,6 ditertiary butyl phenol, gm | 0.1 | 852 | 68 |
| 10 | Phenothiazine (formula above) plus 4,4′-methylene bis 2,6 ditertiary butyl phenol, gm. each. | 0.5 | 1,200 | 26 |
| 11 | Quinoline, gm 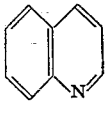 | 0.2 | 2,360 | 50 |
| 12 | Benzyl disulfide, gm 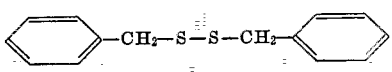 | 0.2 | 433 | 67 |
| 13 | Thiobenzanilide, gm 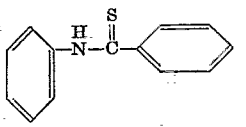 | 0.2 | 673 | 91 |
| 14 | Diethyl aniline, gm 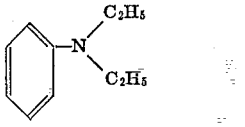 | 0.2 | 815 | 36 |

| Test | Inhibitor | Amount | Polymer Produced, p.p.m. Based on Total Ethylene Reacted | Catalyst Efficiency, Grams Ethylene Converted per Gram of Triethyl Aluminum |
|---|---|---|---|---|
| 15 | Thiobarbituric acid, gm | 0.2 | 1,020 | 41 |

$$\begin{array}{c} CH_2 \\ O=C \quad C=O \\ HN \quad NH \\ C \\ \parallel \\ S \end{array}$$

(Materials which deactivate the catalyst completely)

| | | | | |
|---|---|---|---|---|
| 16 | Thioacetamide, gm | 0.2 | | (1) |

$$\begin{array}{c} S \\ \parallel \\ CH_3-C-NH_2 \end{array}$$

| | | | | |
|---|---|---|---|---|
| 17 | Thianthrene, gm | 0.2 | | (1) |

(thianthrene structure)

| | | | | |
|---|---|---|---|---|
| 18 | Benzoquinone, gm | 0.2 | | (1) |

$$\begin{array}{c} O \\ \parallel \\ C \\ HC \quad CH \\ \parallel \quad \parallel \\ HC \quad CH \\ C \\ \parallel \\ O \end{array}$$

| | | | | |
|---|---|---|---|---|
| 19 | 2,4,6 trimethyl pyridine, gm | 0.2 | | (1) |

(2,4,6-trimethylpyridine structure)

| | | | | |
|---|---|---|---|---|
| 20 | Styrene, gm | 0.2 | | (1) |

(styrene structure, —CH=CH₂)

| | | | | |
|---|---|---|---|---|
| 21 | Thiourea, gm | 0.2 | | (1) |

$$\begin{array}{c} S \\ \parallel \\ H_2N-C-NH_2 \end{array}$$

| | | | | |
|---|---|---|---|---|
| 22 | Diphenyl ether, gm | 0.2 | | (1) |

(diphenyl ether structure)

| | | | | |
|---|---|---|---|---|
| 23 | Dibutyl p-cresol, gm | 0.2 | | (1) |
| 24 | Thiophene, gm | 0.2 | | (1) |

$$\begin{array}{c} HC \text{———} CH \\ \parallel \quad \quad \parallel \\ HC \quad \quad CH \\ \diagdown \quad \diagup \\ S \end{array}$$

[1] No reaction.

The data presented above show that the heavy neutral lubricating oil reduced polymer formation to a lower level than any other inhibitor tested. Furthermore, the data show that the heavy neutral lubricating oil also elevated catalyst efficiency so that it provided by far the best combination effect of all materials tested considering both reduced polymer formation and increased catalyst efficiency.

EXAMPLE 3

A further series of tests were conducted which differ from those described above in that in place of the autoclave a tubular reactor was used which was 256 feet long and 0.546 inch in internal diameter to provide a total reactor volume of 0.40 cubic feet. No alumina co-catalyst was used. The pressure employed in this series of tests was 3000 pounds per square inch gauge. The tubular reactor was immersed in a bath of pressurized boiling water. The ethylene was charged to the inlet of the tubular reactor and was permitted to be preheated to the temperature of reaction prior to injection of triethyl aluminum catalyst to the tube at an intermediate position along the length thereof. The ethylene feed rate was 29.4 pounds per hour per cubic feet of reactor and the bath temperature was 395° F. which was close to the reaction temperature. The catalyst feed rate was adjusted so that 65 percent of the ethylene was converted. The results of these tests are shown in Table 2.

of sulfur concentration in a lubricating oil upon polymer formation, catalyst efficiency and reactor efficiency. These tests were performed utilizing as solvents for the triethyl aluminum catalyst various lubricating oils derived from natural crudes which had been hydrogenated to various sulfur levels. A blank test was performed in which the catalyst solvent was a sulfur-free $C_{22}$ to $C_{36}$ recycle stream of the alpha olefin process. The tests were performed in a tubular reactor immersed in a bath of boiling water maintained at a temperature of 395° F. The ethylene was charged to the reactor and permitted to preheat to

TABLE 2

| Run | Catalyst Solvent Type | Weight Percent of Feed | Catalyst Efficiency, Grams Ethylene Converted per Gram of Catalyst | Reactor Efficiency, Grams Ethylene Converted per Hour per Milliliter of Reactor Volume per Weight Fraction of Catalyst in Reactor Feed | Polymer, p.p.m. Based on Total Ethylene Reacted | | |
|---|---|---|---|---|---|---|---|
| | | | | | Removed by Effluent Filter | Removed From Reactor Surfaces | Total |
| 1 | Cyclohexane ᵃ | 5.4 | 164 | 92.8 | 609 | 437 | 1,046 |
| 2 | do | 5.5 | 163 | 88.7 | 758 | 797 | 1,555 |
| 3 | Heavy neutral lubricating oil of Example 2 | 4.5 | 225 | 111.0 | 290 | 110 | 400 |
| 4 | do | 5.0 | 200 | 100.0 | 42 | 372 | 414 |
| 5 | do | 9.0 | 209 | 110.0 | 152 | 135 | 287 |
| 6 | do | 19.0 | 182 | 106.0 | 40 | 134 | 174 |
| 7 | Cyclohexane | 5.4 | 175 | 88.0 | 474 | 200 | 674 |
| 8 | Recycle $C_{22}$–$C_{36}$ alpha olefins | 4.8 | 200 | 99.0 | 800 | 720 | 1,520 |
| 9 | do | 11.5 | 195 | 104.0 | 470 | 256 | 726 |
| 10 | do.ᵇ | 12.4 | 147 | 80.0 | 330 | 310 | 640 |
| 11 | 150 Bright stock lubricating oil ᶜ | 4.3 | 230 | 120.0 | 55 | | |

ᵃ Triisobutyl aluminum used as catalyst in this run (but catalyst and reactor efficiencies were calculated on the basis of triethylaluminum equivalents).
ᵇ Contains 113 p.p.m. of phenothiazine and 113 p.p.m. of 4,4′-methylene bis 2,6 diteritary butyl phenol.
ᶜ See specifications for lubricating oil of Run No. 2, Table 3.

The above data show that, by far, the lowest polymer formation of the tests was achieved with a lubricating oil solvent such as the heavy neutral base oil described in Example 1 or the 150 bright stock lubricating oil. The above data also show that the highest catalyst efficiencies are achieved with the lubricating oil solvents of this invention.

EXAMPLE 4

A series of tests were performed to illustrate the effect reaction temperature prior to charging a solvent solution containing 6.0 percent by weight of triethyl aluminum. Ethylene was charged at a rate of 30 pounds per hour per cubic foot of reactor volume. The reactor pressure was 3400 pounds per square inch gauge and 65 weight percent of the ethylene was converted. The results of these tests are shown in Table 3 below and the characteristics of several of the lubricating oil solvents are tabulated in Table 4.

TABLE 3

| | Solvent | | | Catalyst Efficiency, Grams Ethylene Converted per Gram of Catalyst | Reactor efficiency, grams Ethylene Converted per Hour per Milliliter of Reactor Volume per Weight Fraction of Catalyst in Reactor Feed | Polymer, p.p.m. | | |
|---|---|---|---|---|---|---|---|---|
| | Type | Weight Percent of Feed | Sulfur, p.p.m. | | | Removed From Effluent by Filters | Build-Up on Reactor Surfaces | Total |
| Run No.: | | | | | | | | |
| 1 | Heavy neutral lubricating oil | 4.7 | 250 | 196 | 97 | 127 | 368 | 495 |
| 2 | 150 Bright stock lubricating oil | 4.3 | 500 | 231 | 123 | 75 | 547 | 622 |
| 3 | Double hydrogenated neutral lubricating oil | 4.7 | 50 | 213 | 113 | 82 | 470 | 552 |
| 4 | Extract of heavy neutral lubricating oil | 6.0 | 4,800 | 153 | 78 | 70 | 150 | 220 |
| 5 | 200 Bright stock lubricating oil | 4.1 | 1,700 | 230 | 115 | 114 | 325 | 439 |
| 6 | $C_{22}$ to $C_{36}$ recycle olefins | 4.8 | | 200 | 99 | 800 | 720 | 1,520 |

TABLE 4

| | Lubricating oil of Run No. 1, Table 3 | Lubricating oil of Run No. 2, Table 3 | Lubricating oil of Run No. 5, Table 3 |
|---|---|---|---|
| Gravity, API, D287 | 28.7 | 25.9 | |
| Viscosity, SUS, D2161, 100° F | 591.0 | 2,486.0 | 835.5 |
| Viscosity, SUS, D2161, 210° F | 683.0 | 152.8 | 4,298.0 |
| Viscosity Index, D567 | 97.0 | 98.0 | 97.0 |
| Flush, OC, D92, ° F | 500.0 | 590.0 | 615.0 |
| Fire, OC, D92, ° F | 570.0 | 650.0 | 675.0 |
| Pour Point, D97, ° F | 10.0 | 5.0 | 5.0 |
| Color, D1500 | 1.5 | 5.0 | 6.5 |
| Distillation, vacuum corrected to 760 mm., D1160 end point, ° F | 1,073 | | |
| Percent condensed at, ° F.: | | | |
| 5 | 848 | 940 | 980 |
| 10 | 877 | 973 | (¹) |
| 20 | 900 | 1,010 | |
| 30 | 913 | 1,032 | |
| 40 | 923 | 1,048 | |
| 50 | 936 | 1,001 | |
| 60 | 948 | 1,072 | |
| 70 | 961 | (²) | |
| 80 | 980 | | |
| 90 | 1,007 | | |
| 95 | 1,026 | | |

¹ Cracks near 1,050.
² Cracked at 1,081.

Table 3 shows that although the lubricating oil solvent, containing 4800 parts per million of sulfur reduced polymer formation as compared to the sulfur-free solvent, it disadvantageously reduced catalyst efficiency and reactor efficiency to levels substantially below that achieved in the test in which the solvent was sulfur-free. On the other hand, the lubricating oil solvents having between 50 and 1700 parts per million of sulfur not only reduced polymer formation as compared to the sulfur-free solvent, but they also produced substantially equal or improved catalyst and reactor efficiencies as compared to the sulfur-free solvent.

We claim:

1. A catalytic process for the production of normally liquid alpha olefins from ethylene under reaction conditions of temperature and pressure comprising, reacting ethylene in the presence of a hydrocarbon oil derived from a natural crude and an alkyl aluminum catalyst substantially without co-catalysts which tend to produce solid rather than liquid product, said hydrocarbon oil containing substantially only components having boiling points of at least about 550° F. and containing the sulfur components in the natural crude from which it is derived in a hydrogen treated condition to convert a portion of the sulfur to hydrogen sulfide so that the hydrocarbon oil contains between about 1 and 4000 parts per million of sulfur, the amount of said hydrocarbon oil being between about 0.1 and 50 percent by weight of the total charge.

2. The process of claim 1 wherein said hydrocarbon oil is a lubricating oil.

3. The process of claim 1 wherein said hydrocarbon oil consists substantially entirely of components having a critical temperature above the reaction temperature and a critical pressure below the reaction pressure.

4. The process of claim 1 wherein said catalyst is triethyl aluminum.

5. A catalytic process for the production of normally liquid alpha olefins from ethylene under reaction conditions of temperature and pressure comprising preheating an ethylene charge substantially to reaction temperature, charging a hydrocarbon oil derived from natural crude and alkyl aluminum catalyst substantially without charging co-catalysts which tend to produce solid rather than liquid product to said preheated ethylene, said hydrocarbon oil containing substantially only components having boiling points of at least about 550° F. and containing the sulfur components in the natural crude from which it is derived in a hydrogen treated condition to convert a portion of the sulfur to hydrogen sulfide so that the hydrocarbon oil contains between about 1 and 4000 parts per million of sulfur, the amount of said hydrocarbon oil being between about 0.1 and 50 percent by weight of the total charge.

6. The process of claim 5 wherein said hydrocarbon oil is a lubricating oil.

7. The process of claim 5 wherein said hydrocarbon oil consists substantially entirely of components having a critical temperature above the reaction temperature and a critical pressure below the reaction pressure.

8. The process of claim 5 wherein said catalyst is triethylaluminum.

9. A catalytic process for the production of normally liquid alpha olefins having between about 4 and 40 carbon atoms from ethylene under reaction conditions of temperature and pressure comprising charging ethylene to one end of an elongated tubular reactor, preheating ethylene in said tubular reactor substantially to reaction temperature, charging alkyl aluminum catalyst substantially without charging co-catalysts which tend to produce solid rather than liquid product and an hydrogenated hydrocarbon fraction derived from a natural crude to said tubular reactor at an intermediate position therein at which said ethylene is substantially preheated to reaction temperature, said hydrocarbon fraction containing substantially only components having boiling points of at least about 550° F. and containing the sulfur compounds in the natural crude from which it is derived in a hydrogen treated condition to convert a portion of the sulfur to hydrogen sulfide so that the hydrocarbon oil contains between about 1 and 4000 parts per million of sulfur, the amount of said hydrocarbon fraction being between about 0.1 and 50 percent by weight of the total charge.

10. The process of claim 9 wherein said hydrocarbon fraction is a lubricating oil.

11. The process of claim 9 wherein said hydrocarbon fraction is comprised substantially entirely of components having a critical temperature above the reaction temperature and a critical pressure below the reaction pressure.

12. The process of claim 9 wherein said catalyst is triethyl aluminum.

13. A process for the production of normally liquid alpha olefins having between about 4 and 40 carbon atoms, at a temperature between about 285° F. and 615° F. and a pressure of at least about 1000 pounds per square inch, comprising charging ethylene to the inlet end of an elongated metallic reactor tube immersed in a bath of pressurized boiling water while metals in said tube are in an oxide state, said boiling water preheating said ethylene substantially to reaction temperature, charging a solution comprising between about 0.1 and 40 percent by weight of triethylaluminum substantially without charging co-catalysts which tend to produce solid rather than liquid product in a hydrogenated hydrocarbon fraction derived from a natural crude to substantially the intermediate position in said reactor tube closest to the inlet end thereof whereat said ethylene is substantially preheated to reaction temperature, said hydrocarbon fraction containing substantially only components having boiling points of at least about 550° F. and containing the sulfur compounds in the natural crude from which it is derived in a hydrogen treated condition to convert a portion of the sulfur to hydrogen sulfide so that said hydrocarbon oil contains between about 1 and 4000 parts per million of sulfur, the amount of said hydrocarbon fraction being between about 0.1 and 50 percent by weight of the total charge.

14. A catalytic process for the production of normally liquid alpha olefins from ethylene at a temperature between about 285° F. and 615° F. comprising reacting ethylene in the presence of a hydrocarbon oil derived from a natural crude and an alkyl aluminum catalyst substantially without co-catalysts which tend to produce solid rather than liquid product, said hydrocarbon oil containing substantially only components having boiling points of at least about 550° F. and containing the sulfur components in the natural crude from which it is derived in a hydrogen treated condition to convert a portion of the sulfur to hydrogen sulfide so that the hydrocarbon oil contains between about 1 and 4000 parts per million of sulfur, the amount of said hydrocarbon oil being between about 0.1 and 50 percent by weight of the total charge.

15. The process of claim 14 wherein said hydrocarbon oil is a lubricating oil.

16. The process of claim 14 wherein said hydrocarbon oil consists substantially entirely of components having a critical temperature above the reaction temperature and a critical pressure below the reaction pressure.

References Cited
UNITED STATES PATENTS

| | | | |
|---|---|---|---|
| 3,310,600 | 3/1967 | Ziegler et al. | 260—683.15 |
| 3,441,630 | 4/1969 | Langer et al. | 260—683.15 |
| 2,699,457 | 1/1955 | Ziegler et al. | 260—683.15 |
| 2,996,459 | 8/1961 | Anderson et al. | 260—94.9 X |
| 3,303,175 | 2/1967 | Achon | 260—88.2 |
| 3,318,858 | 5/1967 | Nakaguchi et al. | 260—93.7 |
| 3,377,325 | 4/1968 | Loveless | 252—429 X |

PAUL M. COUGHLAN, JR., Primary Examiner

PO-1050
(5/69)

UNITED STATES PATENT OFFICE
CERTIFICATE OF CORRECTION

Patent No. 3,502,741               Dated   March 24, 1970

Inventor(s) Herbert B. Fernald, William Gall, Bernard H. Gwynn and Elwood E. Nelson It is certified that error appears in the above-identified patent and that said Letters Patent are hereby corrected as shown below:

Column 5, line 51, "400" should read --4000--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents